(12) United States Patent
McLellan et al.

(10) Patent No.: US 11,710,360 B2
(45) Date of Patent: Jul. 25, 2023

(54) MOBILE DEVICE FOR SAFE, SECURE, AND ACCURATE DELIVERY OF ITEMS

(71) Applicant: United States Postal Service, Washington, DC (US)

(72) Inventors: Charles P. McLellan, Fairfax, VA (US); Gabriel Michael Yessin, Arlington, VA (US); William Albert Tartal, Baltimore, MD (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 17/451,301

(22) Filed: Oct. 18, 2021

(65) Prior Publication Data
US 2022/0036675 A1 Feb. 3, 2022

Related U.S. Application Data

(63) Continuation of application No. 16/888,363, filed on May 29, 2020, now Pat. No. 11,151,824, which is a
(Continued)

(51) Int. Cl.
*G07C 9/00* (2020.01)
*E05B 47/00* (2006.01)
(Continued)

(52) U.S. Cl.
CPC .......... *G07C 9/00896* (2013.01); *E05B 47/00* (2013.01); *G06F 21/44* (2013.01);
(Continued)

(58) Field of Classification Search
CPC ............ G07C 9/00896; G07C 9/00871; G07C 2009/00769; G07C 2209/63
See application file for complete search history.

(56) References Cited

U.S. PATENT DOCUMENTS

| | | | |
|---|---|---|---|
| 3,889,501 A | 6/1975 | Fort | |
| 4,789,859 A | 12/1988 | Clarkson et al. | |

(Continued)

FOREIGN PATENT DOCUMENTS

| | | |
|---|---|---|
| CN | 101573502 A | 11/2009 |
| CN | 107724814 A | 2/2018 |

(Continued)

OTHER PUBLICATIONS

International Search Report & Written Opinion dated Sep. 25, 2018 in International Application No. PCT/US2018/037159 filed Jun. 12, 2018.
(Continued)

*Primary Examiner* — Nabil H Syed
(74) *Attorney, Agent, or Firm* — Knobbe Martens Olson & Bear LLP

(57) ABSTRACT

Embodiments of a system and method for using a mobile device to assist with the efficient and secure delivery of item. The mobile device can assist an item deliver to lock or unlock secure item delivery receptacles. The mobile device can also notify an item deliverer about particular delivery conditions associated with particular delivery endpoints. The mobile device can further help the item deliverer to determine whether or not he or she is delivering the item to the correct location.

16 Claims, 9 Drawing Sheets

Related U.S. Application Data continuation of application No. 16/006,595, filed on Jun. 12, 2018, now Pat. No. 10,762,731.

(60) Provisional application No. 62/568,098, filed on Oct. 4, 2017, provisional application No. 62/518,943, filed on Jun. 13, 2017.

(51) Int. Cl.
| | |
|---|---|
| *G06Q 50/32* | (2012.01) |
| *G06F 21/44* | (2013.01) |
| *G06Q 10/083* | (2023.01) |
| *H04W 4/021* | (2018.01) |

(52) U.S. Cl.
CPC ........... *G06Q 10/083* (2013.01); *G06Q 50/32* (2013.01); *G07C 9/00571* (2013.01); *E05B 2047/0072* (2013.01); *G07C 2009/0092* (2013.01); *G07C 2009/00769* (2013.01); *G07C 2009/00984* (2013.01); *G07C 2209/63* (2013.01); *H04W 4/021* (2013.01)

(56) References Cited

U.S. PATENT DOCUMENTS

| | | |
|---|---|---|
| 5,140,317 A | 8/1992 | Hyatt, Jr. et al. |
| 5,219,386 A | 6/1993 | Kletzmaier et al. |
| 6,005,487 A | 12/1999 | Hyatt, Jr. et al. |
| 8,922,333 B1 | 12/2014 | Kirkjan |
| 9,378,597 B2 | 6/2016 | Shen et al. |
| 9,728,022 B2 | 8/2017 | Gengler et al. |
| 10,544,624 B2 | 1/2020 | Baker et al. |
| 2002/0180582 A1 | 12/2002 | Nielsen |
| 2003/0160681 A1 | 8/2003 | Menard et al. |
| 2004/0032131 A1 | 2/2004 | Cherry |
| 2005/0285716 A1 | 12/2005 | Denison et al. |
| 2007/0096866 A1 | 5/2007 | Denison et al. |
| 2007/0173253 A1 | 7/2007 | Duan et al. |
| 2007/0257773 A1 | 11/2007 | Hill et al. |
| 2009/0273440 A1 | 11/2009 | Marschalek et al. |
| 2009/0282876 A1 | 11/2009 | Zuraski et al. |
| 2009/0302995 A1 | 12/2009 | Park |
| 2010/0073133 A1 | 3/2010 | Conreux et al. |
| 2011/0181053 A1 | 7/2011 | Marschner et al. |
| 2012/0270496 A1 | 10/2012 | Kuenzi et al. |
| 2013/0067969 A1 | 3/2013 | Webb et al. |
| 2013/0332007 A1 | 12/2013 | Louboutin |
| 2014/0149269 A1 | 5/2014 | Kantarjiev et al. |
| 2015/0027178 A1 | 1/2015 | Scalisi |
| 2015/0141045 A1 | 5/2015 | Qiu et al. |
| 2015/0184426 A1 | 7/2015 | Arlinghaus et al. |
| 2015/0211258 A1 | 7/2015 | Gokcebay |
| 2015/0221152 A1 | 8/2015 | Andersen |
| 2015/0332527 A1 | 11/2015 | Pukari |
| 2016/0042582 A1 | 2/2016 | Hyde et al. |
| 2016/0055694 A1 | 2/2016 | Saeedi et al. |
| 2016/0086400 A1* | 3/2016 | Dumas ..................... G07C 9/20 340/5.61 |
| 2016/0098871 A1* | 4/2016 | Oz ..................... G07C 9/00571 340/5.61 |
| 2016/0186463 A1 | 6/2016 | Roatis et al. |
| 2016/0232484 A1 | 8/2016 | Skaaksrud |
| 2016/0275450 A1 | 9/2016 | Chang |
| 2017/0002586 A1 | 1/2017 | Lee |
| 2017/0061716 A1* | 3/2017 | Davis ................. G07C 9/00309 |
| 2017/0124510 A1 | 5/2017 | Caterino et al. |
| 2017/0328130 A1 | 11/2017 | Baker et al. |
| 2018/0060800 A1 | 3/2018 | Robinson |
| 2018/0075679 A1 | 3/2018 | Niroomand |
| 2018/0300677 A1 | 10/2018 | Wilkinson et al. |

FOREIGN PATENT DOCUMENTS

| | | |
|---|---|---|
| CN | 107829616 A | 3/2018 |
| EP | 2876234 A1 | 5/2015 |
| JP | 2008-540880 A | 11/2008 |

OTHER PUBLICATIONS

International Search Report & Written Opinion dated Aug. 27, 2019 in International Application No. PCT/US2019/032250 filed May 14, 2019.

International Search Report and Written Opinion dated Dec. 16, 2019 in International Application No. PCT/US2019/52659 filed Sep. 24, 2019.

International Preliminary Report on Patentability dated Dec. 17, 2019 in International Application No. PCT/US2018/037159 filed Jun. 12, 2018.

International Preliminary Report on Patentability dated Nov. 26, 2020 in International Application No. PCT/US2019/032250 filed May 14, 2019.

International Preliminary Report on Patentability dated Apr. 8, 2021 in International Application No. PCT/US2019/052659 filed Sep. 24, 2019.

\* cited by examiner

MOBILE DEVICE FOR SAFE, SECURE, AND ACCURATE DELIVERY OF ITEMS

CROSS-REFERENCE TO RELATED APPLICATIONS

This application is a continuation application of U.S. application Ser. No. 16/888,363, filed on May 29, 2020, which is a continuation application of U.S. application Ser. No. 16/006,595, filed on Jun. 12, 2018, now U.S. Pat. No. 10,762,731, issued on Sep. 1, 2020, which, in turn, claims the benefit of priority to U.S. Provisional application Nos. 62/518,943 filed on Jun. 13, 2017 and 62/568,098, filed on Oct. 4, 2017 respectively, the entire contents all of which are hereby incorporated by reference. Any and all applications for which a foreign or domestic priority claim is identified in the Application Data Sheet as filed with the present application are hereby incorporated by reference under 37 CFR 1.57.

BACKGROUND

The disclosure relates to a mobile device used in the delivery of items. More specifically, it relates to a mobile device that allows the user to unlock secure delivery locations, record delivery conditions at delivery locations, and warn item delivery entities about delivery conditions.

SUMMARY

In one aspect described herein, a system for item delivery to secured receptacles comprises a mobile computing device comprising a location module, wherein the location module detects the geographic position of the mobile computing device; a server in communication with the mobile computing device; a memory in communication with the server, the memory storing the identities of one or more locks locking secured receptacles; wherein the mobile computing device is configured to communicate authentication information to the one or more locks in order to unlock the one or more locks when the mobile computing device based on the detected geographic position of the mobile computing device.

In some embodiments, the system further comprises a user interface in communication with the server, wherein the user interface is configured to receive a lock identifier from a user, the lock identifier related to one of the one or more locks, and wherein the user interface is configured to store information regarding the lock identifier in the memory.

In some embodiments, the server is configured to broadcast a mobile delivery device identifier to the one or more locks, wherein the mobile delivery device identifier is usable to authenticate the mobile delivery device to the one or more locks.

In some embodiments, the memory further stores a geographic boundary associated with the one or more locks.

In some embodiments, the mobile computing device is configured to communication authentication to the one or more locks when the detected geographic position of the mobile computing device is approaching the geographic boundary associated with one of the one or more locks.

In some embodiments, the mobile computing device is configured to communication authentication to one of the one or more locks when the detected geographic position of the mobile computing device is within the geographic boundary associated with the one of the one or more locks.

In some embodiments, the server is configured to receive a detected location of the mobile computing device and is configured to periodically receive requests from the one or more locks regarding the position of the mobile computing device.

In some embodiments, the server is further configured to determine and transmit a wait time signal to the one or more locks, the wait time being based on received detected location of the mobile computing device.

In some embodiments, the determined wait time signal instructs the one or more locks when to request a subsequent wait time signal.

In some embodiments, the server determines a shorter wait time to transmit to one of the one or more locks as the mobile computing device is closer to the one of the one or more locks.

In another aspect described herein a method of unlocking a secured receptacle comprises detecting, by a mobile computing device, the geographic location of the mobile computing device; comparing the geographic location of the mobile computing device to a geographic boundary established for a delivery point, the delivery point having a receptacle secured by a lock; and communicating authentication information to unlock the lock based on the compared geographic location to the geographic boundary.

In some embodiments, communicating the authentication information occurs when the geographic location of the mobile computing device is within the geographic boundary established for the delivery point.

In some embodiments, communicating the authentication information occurs when the geographic location of the mobile computing device is approaching the geographic boundary established for the delivery point.

In some embodiments, the method further comprises receiving, from the lock, a request for a wait time signal; determining, by a server, a wait time based on the received geographic location of the mobile computing device; and transmitting the wait time signal to the lock.

In some embodiments, the wait time signal includes instructions for when to request a subsequent wait time signal.

In some embodiments, the determined wait time is smaller as the mobile computing device is closer to the geographic boundary established for the delivery point.

In some embodiments, the method further comprises receiving, from a user interface, lock information for the lock securing the receptacle, and storing the lock information in a memory.

In some embodiments, the authentication information is based at least in part on the received lock information.

In some embodiments, the method further comprises broadcasting, by a server, a mobile computing device identifier to the lock, and wherein the authentication information includes the mobile computing device identifier.

In another aspect described herein, a system for item delivery to secured receptacles comprises means for receiving lock information for a lock securing a receptacle; means for storing the lock information; means for detecting the geographic location of the mobile computing device; means for comparing the geographic location of the mobile computing device to a geographic boundary established for a delivery point, the delivery point having the receptacle secured by the lock; and means for communicating authentication information to unlock the lock based on the compared geographic location to the geographic boundary, wherein the authentication information is based at least in part on the received lock information.

The embodiments disclosed herein each have several aspects, no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for receiving items.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
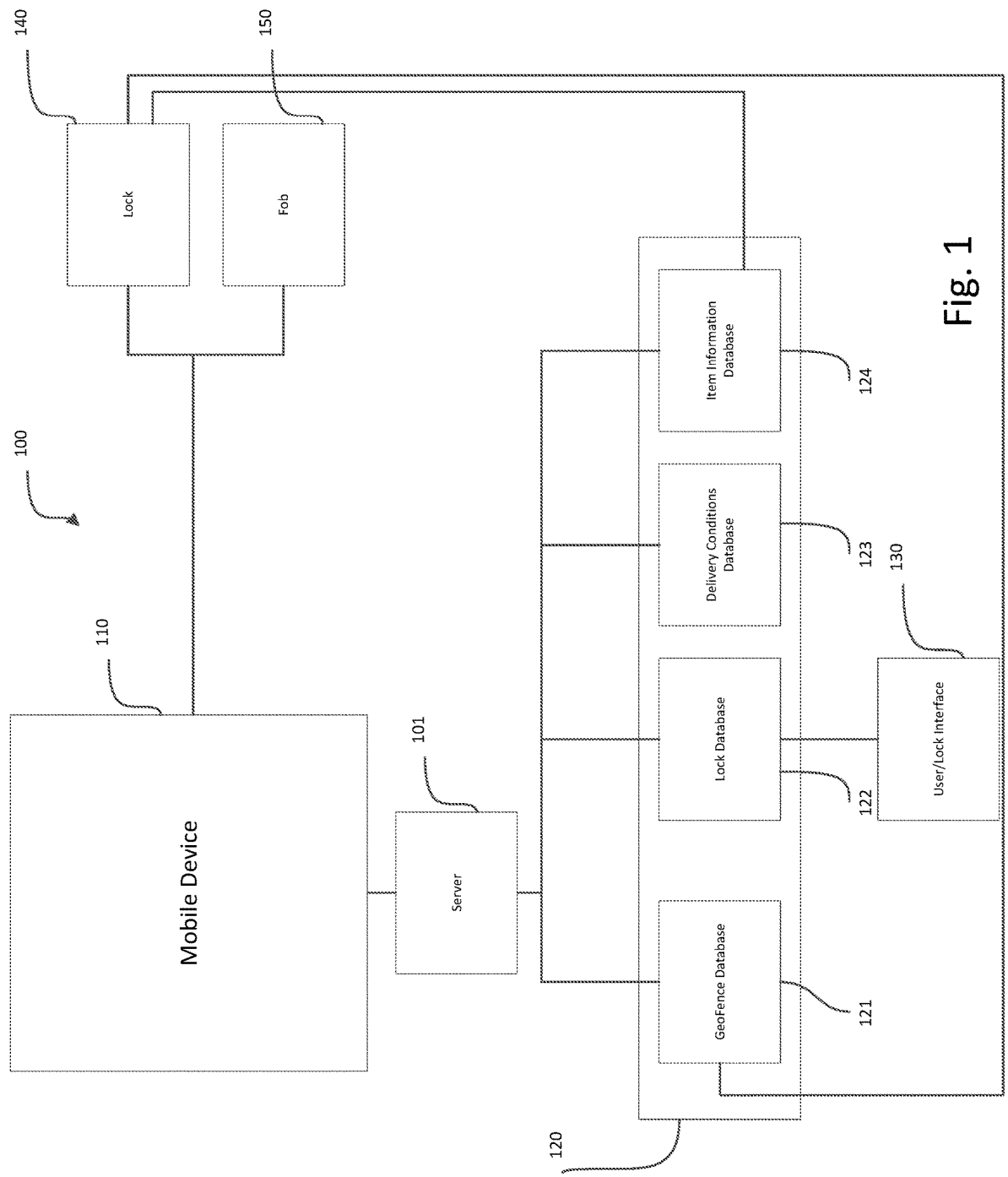
FIG. 1 is block diagram showing of an embodiment of the system.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

The system described herein provides for faster and more efficient delivery of items. In particular, when an item deliverer, such as a carrier, is delivering items, the carrier can bring along a mobile computing device. In some embodiments, this mobile device could be a mobile delivery device ("MDD") as used by the United States Postal Service. This mobile device can be used for many functions, some of which are described herein. To perform these functions, the mobile device can communicate with numerous outside components, including external databases and other peripherals.

For example, the MDD can be used to identify the location of the carrier along a route or within a geographical area, and can provide instructions, information, warnings, and the like regarding route conditions, known obstacles, recipient instructions, or other information.

In some embodiments, the MDD can be used as a key for opening receptacles via an electronic signal, or can be a component in a system for unlocking a receptacle. For example, an electronic lock on a receptacle may not open until a verified or certain MDD is within a range or geofence of the receptacle and/or lock. To check for proximity of the MDD, the receptacle may need to be supplied by battery power to detect the MDD and to operate the lock. It is inefficient for the receptacle or the lock continuously checking for the MDD within range of the receptacle or geofence of the receptacle. A system where the electronic lock receives the position of the MDD at certain intervals, where the intervals change based on MDD position, can improve battery life and efficiency of the electronic lock.

An example of the numerous system components that the mobile delivery device can communicate with is shown in FIG. 1. FIG. 1 displays a system 100 using a mobile delivery device 110 in a distribution network. The mobile delivery device can be used by the item deliverer or carrier to improve the efficiency and security for delivering items. For example, carriers can use the mobile delivery device 110 to lock or unlock secure delivery locations, such as electronic locks on receptacles. The mobile delivery device 110 could also be used to display information about delivery conditions on delivery routes. In some embodiments, the mobile delivery device 110 can also be used to create, input, or edit the information about the delivery points or the delivery routes. The mobile delivery device 110 could also be used to identify when an item deliverer is potentially delivering an item to the wrong location.

In performing these various functions, it is advantageous for an item deliverer to know where he/she currently is and what delivery point he is either at or approaching. In some embodiments, this can be achieved using a technique known as geofencing. When using geofencing, a geographic area associated with an address, delivery point, or other location is defined using a set of geodetic coordinates creating a "fence" around the area. The mobile delivery device 110 can determine its location, and then, either locally or remotely by accessing a separate component, can determine whether the device's location is within a geofence corresponding to a delivery location, or within a geofence drawn around any desired location or point. Using geofencing can be advantageous to the various functions that the mobile delivery device 110 performs, the mobile device can determine its current location and compare it to a list of geofences in some embodiments.

In some embodiments, mobile delivery device 110 is in communication with a server 101 which is in communication with a collection of databases 120 in order assist in the performance of the mobile devices functions. In some embodiments, mobile delivery device 110 communicates with databases 120 via telephone, cable, fiber-optic, or any other wired communication network. In some embodiments, mobile delivery device 110 may communicate with databases 120 via cellular networks, WLAN networks, or any other wired or wireless network. In some embodiments mobile delivery device 110 may not need to separately communicate with databases 120 because databases 120 are contained fully or partially within mobile delivery device 110.

In some embodiments, databases 120 can contain a geofence database 121. Geofence database 121 can store the various sets of geodetic coordinates that form a fence around a plurality of areas, which can be associated with, for example, an address, delivery point, a point of interest, or any desired location or feature. In some embodiments, mobile delivery device 110 can send the current location of the mobile device to the geofence database 121 and then receive back a signal indicative of being within a geofence, what address delivery point or other location the mobile delivery device 110 is currently at or is approaching, and the like. In some embodiments, the location of the mobile delivery device 110 is shared with other databases 120, and can be used to begin other processes or to obtain additional information. In some embodiments, the signal received from the geofence database can act as a trigger to alert the carrier, or the mobile delivery device 110, or other component with which the mobile delivery device 110 is in electrical communication.

In some embodiments, the mobile delivery device 110 can periodically send its location to the geofence database 121 and the geofence database 121 will periodically send a signal indicative of a geofence, what address, delivery point or other location that the mobile delivery device 110 is currently at or is approaching. In some embodiments, the mobile delivery device 110 can record its location every second and then periodically send a batch of the locations, such as GPS breadcrumb data, to the geofence database 121, such as every 1 minute or 5 minutes. In some embodiment, the geofence database 121 can use the entire batch of geodetic coordinates to determine a mobile delivery device 110's current location and to take action or send signals based on a future anticipated location of the mobile delivery device 100. In some embodiments, the geofence database 121 will actually transmit some amount of the various sets of geodetic coordinates to the mobile delivery device 110 so that the mobile device can itself determine what address, delivery point or other location that the mobile delivery device 110 is currently at or is approaching. For example, the geofence database 121 could transmit the sets of geodetic coordinates associated with every delivery point along the route of the item deliverer who will be using the mobile delivery device 110. In some embodiments, the geofence information for a carrier's route will be downloaded or stored locally on the carrier's mobile delivery device 110.

In some embodiments, the distribution network can broadcast an identifier for the mobile delivery device 110, such as an electronic serial number, to the components of the distribution network that may interact with the mobile delivery device 110 along the route. The serial number will be sent to the locks 140 along the route. When the mobile delivery device 110 interacts with the locks 140, the broadcast serial number can be compared to the serial number of the mobile delivery device 110 to confirm the identity of the mobile delivery device 110. If the broadcast serial number and the serial number of the mobile delivery device 110 paring with the lock do not match, then the lock 140 will not have the proper authentication, and will not open.

In some embodiments, the server 101 may broadcast a different mobile delivery device 110 serial number to update the locks 140. This may occur when a change to the carriers routes occurs during the day, or if other adjustments are made such that a different mobile delivery device 110 is going to deliver to the delivery points having locks 140 than was originally planned.

In some embodiments, the geofences can be algorithmically defined based on what the geofence is enclosing. For example, if the geofence is designating a delivery point at a house, the algorithm may take as input the geodetic coordinates for the delivery point and calculate a geofence of 5, 10, or 20 meters, or any other distance surrounding the delivery point. In some embodiments, a delivery point, such as a mailbox can have a first geofence defined therearound, and a delivery point, such as a front door or front porch, even if the mailbox and front porch are for the same recipient, can have a second geofence defined therearound. If the geofence is designating a delivery point at an apartment building, the algorithm could calculate a larger geofence of 30 or 40 meters surrounding the point, and all delivery points within the apartment building can be contained within or associated with the geofence. If the geofence is designating location with a delivery condition such as an obstacle or a slippery surface, the geofence could be smaller, such as 5 meters surrounding the geodetic coordinate of the obstacle or slippery surface. In some embodiments, the geofence surrounding a point of interest or a warning can change based on whether the carrier is driving, walking, or based on the type of alert. In some embodiments, it may be advantageous to alert a carrier about an obstacle earlier, that is, using a larger geofence, so a carrier can plan in advance how to avoid or deal with the obstacle.

In some embodiments, custom geofences can be individually added to the geofence database 121. For example, a user, such as a recipient, a carrier, or other distribution network personnel, could designate a geofence that precisely follows the property line of a house or that is two meters north of a location, three meters west, 3 meters, east and 4 meters south. In some embodiments, the mobile delivery device 110 can be used to add custom geofences to the geofence database 121. In other embodiments, geofence database 121 could be connected to a personal computer or other terminal and that terminal could be used to add custom geofences to the database. For example, a supervisor of the item deliverers using the mobile devices could receive a list of delivery conditions such as slippery surfaces and the associated locations from each item deliverer and create a custom geofence for each delivery condition.

The databases 120 include a lock database 122. The lock database 122 can contain information about the receptacles and/or the locks, such as electronic locks, used to secure secured receptacles. In some embodiments the lock database 122 can contain the lock IDs for every lock associated with secured delivery points or receptacles within the distribution network. In some embodiments, the lock database 122 can communicate information enabling cryptographic handshakes/exchanges between an electronic lock and the mobile delivery device 110. In some embodiments, the lock database 122 stores a different information for every lock that has been registered. In some embodiments the server 101 sends cryptographic information or authentication information to the mobile delivery device 110 for operating individual locks. In some embodiments, the server 101 sends authentication information or cryptographic information to the mobile delivery device 110 for some or all of the locks at delivery points along the route of the carrier who will be using the mobile delivery device 110. The authentication information or cryptographic information can include the serial number of the mobile computing device, and the authentication or cryptographic information can be based on lock information received via the user/lock interface 130, which can include the lock ID. The server 101 can determine what signal the mobile delivery device 110 must send to the lock 140 to open the lock, based on the manufacturer's instructions, lock encryption, and any other needed information. The authentication information can include encryption keys, handshake information, a token, and the like. In some embodiments, the server 101 sends the authentication information to the lock 140 when the mobile delivery device 140 is within or is approaching the geofence for the delivery point. In some embodiments, the mobile delivery device 110 sends the authentication information.

In some embodiments, lock database 122 can also be in communication with a user/lock interface 130 via telephone, cable, fiber-optic, cellular networks, WLAN networks, or any other wired or wireless communication network. The user/lock interface 130 can be used to register compatible locks for securing delivery points. In some embodiments, the lock can be registered by entering a lock ID and/or other lock information into lock database 122. In some embodiments, the user/lock interface 130 is a website or similar system accessed by a personal computer, phone or the like. The user enters the lock ID and the associated delivery point or address for the lock into the website, which then registers the lock ID with the lock database 122. In some embodiments the user/lock interface 130 is an app on a smartphone or similar device. In some embodiments, the app can be used to register the lock ID with the lock database 122 by scanning a QR or barcode or similar image on the lock. This can generate the correct lock ID in the app which then communicates the lock ID with the lock database 122. In some embodiments, the user can then enter the delivery point or address associated with the lock, or where the receptacle having the lock thereon is located. In other embodiments, the user can scan the lock ID while at the delivery point or address that the user wants to be associated with the lock. The app can then enter the current location as the delivery point or address by using the current location calculated by the smartphone or similar device.

In some embodiments, the databases 120 can contain a delivery conditions database 123. Delivery conditions database 123 can store delivery conditions such as information about hazards or other useful information associated with various delivery points or addresses. For example, delivery conditions database 123 can store information like a certain address or delivery point or other location has a dangerous animal, such as a dog, or that there is a slippery surface, traffic, a construction obstacle, a trip hazard, that the mailbox for that delivery point or address is at the back of the building, or there are specific delivery instructions for a delivery point. Delivery conditions database 123 could also be specific delivery instructions for a particular delivery point, such as "do not walk on grass," or what time the person receiving the item is home, or instructions to deliver items to the garage or other house location, or instructions to only ring the doorbell at certain times that the person is home, or a gate or door code necessary to access a delivery location. For example, In some embodiments, the mobile delivery device 110 can add and delete delivery conditions from the delivery conditions database 123. The delivery conditions changes can then be dispersed to all other mobile devices that are connected to the delivery conditions database 123.

In some embodiments, the delivery conditions database 123 disperses the changed delivery condition information periodically, such as when the mobile delivery devices 100 are docked in charging stations, or can disperse the changed delivery condition information over the air in real time or near real time as information changes. In some embodiments, the delivery conditions database 123 can transmit delivery conditions to the mobile delivery device 110 so that the mobile delivery device 110 can display information about the delivery conditions. In some embodiments, the delivery conditions database 123 sends all the delivery conditions to the mobile delivery device 110 for every delivery point or other location along the route of the item deliverer who will be using the mobile delivery device 110. In other embodiments, the delivery conditions database 123 can send information all of the information about delivery conditions and then the mobile device will only activate alerts about delivery conditions for delivery points, addresses or other locations around its route. In some embodiments, the mobile delivery device 110 can additionally activate alerts for delivery conditions on a different route if the mobile device determines that the user is now traveling a different route.

In some embodiments, the databases 120 can contain an item information database 124. Item information database 124 can contain information about the correct delivery point or address for each item to be delivered by the item deliverer as well as routes for each item deliverer to use when delivering items. In some embodiments, the item information database 124 sends all information about the correct delivery points to the mobile delivery device 110 for every item to be delivered along the route of the item deliverer who will be using the mobile delivery device 110. The mobile delivery device 110 can then use that information to determine whether the item deliverer is potentially delivering an item to the wrong location. In some embodiments, the mobile delivery device 110 can determine where the item is being delivered at by having the item deliverer scan a barcode, QR code, or other identifier on the item using the mobile delivery device 110. The mobile delivery device 110 can then use the geofence system to determine where the scan occurred. In other embodiments, the mobile device can send the location where the scan occurred to the item information database 124 and then the item information database 124 can determine where the scan should occur.

Delivery condition information, geofence information, lock information and item information for delivery points or other points from the databases 120 can be grouped into or associated with delivery routes. For example, a local unit delivery facility, such as a post office, can be the hub for a plurality of delivery points. Mobile delivery devices 110 at the post office are not necessarily permanently assigned to the delivery routes. A carrier may use one mobile delivery device 110 on one day, and another mobile delivery device 110 on another day. The carrier each day can log in to one of the mobile delivery devices 110 at the post office. The carrier identity can identify the delivery route to the mobile delivery device 100, such as is the case when a carrier is permanently assigned to a specific route. In some embodiments, the carrier can input a route identifier to identify the delivery route on which the mobile delivery device 110 will be used. When the mobile delivery device 110 receives the delivery route identifier, the mobile delivery device 110 can request the delivery geofence information, the lock information, item information, and the delivery condition information from the databases 120 for delivery points or locations associated with the delivery route to which the mobile delivery device 110 is assigned. In some embodiments, the databases 120 will push the specific delivery information to the individual mobile delivery devices 110 according to the route identifiers.

In some embodiments, a custom delivery route may be generated by a supervisor, or automatically by a dynamic routing process, and delivery points can be dynamically assigned to a delivery route, and the information from the databases can be provided to the mobile delivery device 110 assigned to the custom delivery route.

In some embodiments, the mobile delivery device 110 can communicate with a lock 140. In some embodiments, lock 140 is a lock used to secure a receptacle at a delivery point. In some embodiments the lock 140 is an electronic lock that can communicate with the mobile delivery device 110 and/or with the databases 120, such as via a server. The receptacle or the lock 140 can have cellular, Wi-Fi, WLAN, or other wireless communication capability. In some embodiments, the lock 140 can communicate directly with the server in the distribution network or can communicate with a network access point associated with the owner or user of the receptacle. For example, a locked mailbox at a residence or business can communicate with the distribution network, the databases 120 etc., via the network access point, such as a wireless router at the residence or business. The lock 140 can thus access the network via the communication capability of the residence or business.

In some embodiments, the mobile delivery device 110 and lock 140 can communicate via Bluetooth pairing, R/F communication link, or some other wireless or wired communication protocol. In some embodiments, the mobile delivery device 110 can communicate an lock/unlock information, such as cryptographic handshake or authentication information to the lock 140 in order to unlock the lock. As discussed further below, in some embodiments, the mobile delivery device 110 can work in conjunction with a fob 150 to unlock lock 140. In some embodiments, the lock can also be unlocked via a physical key, or using an electronic key pad, or by linking with a device other than the mobile device. In some embodiments, the lock 140 logs what method and who unlocked the lock. In some embodiments, the mobile delivery device 110 can transmit a mobile device identification token that can be used by lock 140 to log which mobile device unlocked lock 140.

In some embodiments, the mobile delivery device 110 can also be in communication with the fob 150. In some embodiments, the fob 150 can work in conjunction with mobile delivery device 110 to unlock lock 140. For example, the fob could contain an additional portion of an encryption key or could contain additional cryptographic information needed to unlock the lock 140, and the fob 150 could separately communicate with the lock 140. In other embodiments, the fob could contain the entire encryption key and transmit the entire key to the lock 140. In some embodiments, the mobile delivery device 110 can load the encryption key or portion of the encryption key into fob 140 using Bluetooth, R/F link, or other wireless or wired communication protocol. In some embodiments the mobile delivery device 110 can load a new key or partial key into the fob every time the mobile device approaches a new lock.

Figure 2:
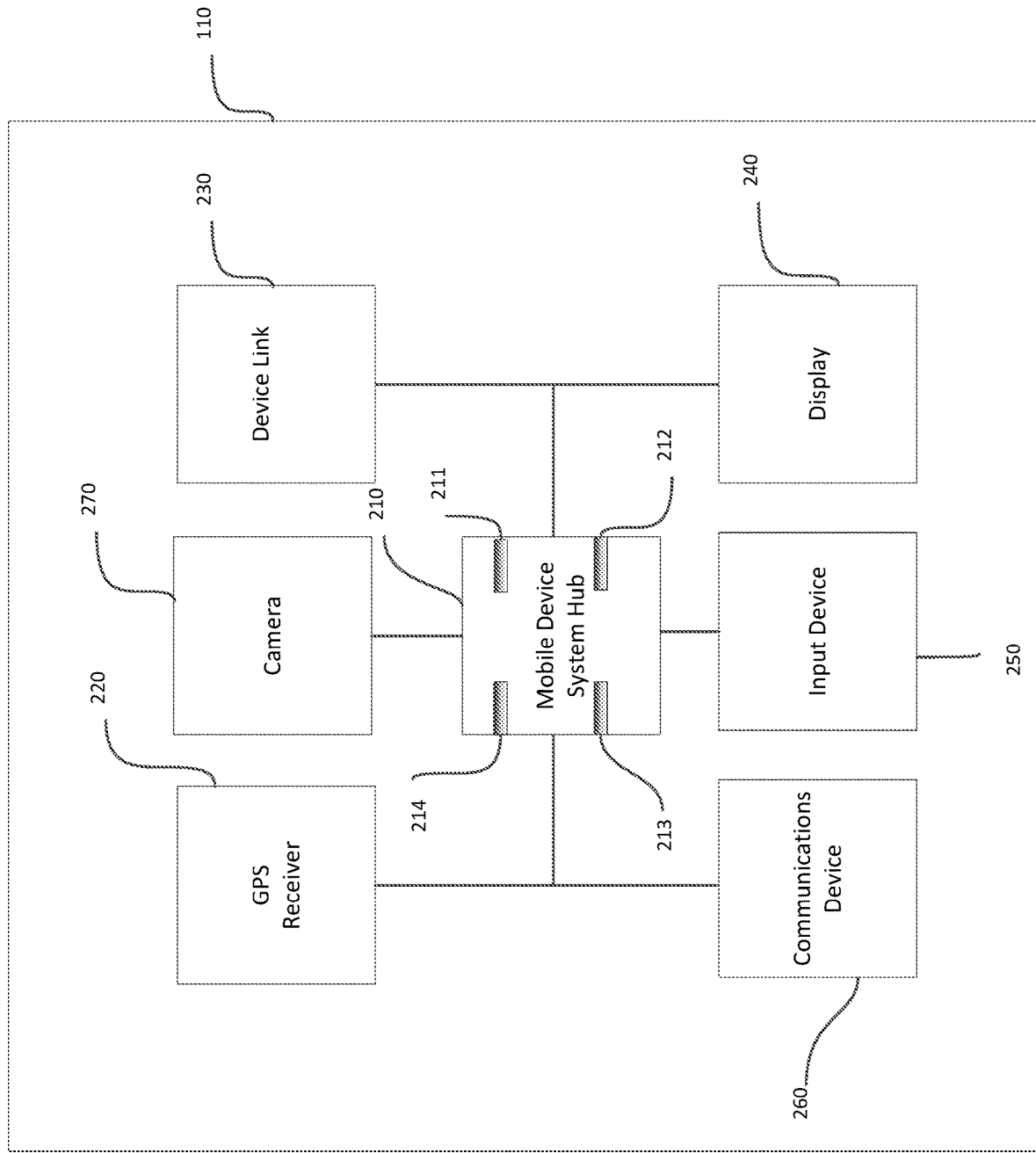
FIG. 2 is a block diagram showing some components of a mobile device.

FIG. 2 is a block diagram showing an exemplary mobile delivery device 110. In some embodiments, mobile delivery device 110 can contain a system hub 210 as well as a GPS receiver 220, a device link 230, display 240, input device 250 and a communications device 260.

The system hub 210 may comprise or be a component of a processing system implemented with one or more processors. The system hub 210 may be a network of interconnected processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 210 may comprise a processor 211 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, j5®, or i3® processor, an AMD Phenom®, A-Series®, or FX® processor, or the like. The processor 211 typically has conventional address lines, conventional data lines, and one or more conventional control lines. The processor 211 may be in communication with a processor memory 212, which may include, for example, RAM memory, flash memory, ROM memory, EPROM memory, EEPROM memory, registers, hard disk, a removable disk, a CD-ROM, or any other form of storage medium known in the art. The processor memory 212 may include, for example, software, at least one software module, instructions, steps of an algorithm, or any other information. In some embodiments, the processor 211 performs processes in accordance with instructions stored in the processor memory 212. These processes may include, for example, controlling features and/or components of the mobile delivery device 110, and controlling access to and from, and transmitting information and data to and from the system hub 210 and the constituent components of the mobile delivery device 110, as will be described herein.

The system hub 210 comprises a system memory 213, configured to store information, such as data received from the geofence database 121, lock database 122, delivery conditions database 123, item information database, and the like. The system memory 213 may comprise a database, a comma delimited file, a text file, or the like. The system hub 210 is configured to coordinate and direct the activities of the components of the expected mobile delivery device 110.

In some embodiments, the processor 211 is connected to a communication feature 214. The communication feature 214 is configured for wired and/or wireless communication. In some embodiments, the communication feature 214 communicates via telephone, cable, fiber-optic, or any other wired communication network. In some embodiments, the communication feature 214 may communicate via cellular networks, WLAN networks, or any other wireless network. The communication feature 214 is configured to receive instructions and to transmit and receive information among components of the mobile delivery device 110, and in some embodiments, with a central server (not shown) or the databases 220, or other resources outside the expected delivery window generation system 110, as desired.

In some embodiments, the various components of the mobile delivery device 110 such as the GPS receiver 220, device link 230, display 240, input device 250, or communications device 260 can be configured to use the processor 211, memory 212, system memory 213, or communications feature 214 or other components of the mobile device system hub 210, or to have their own memory, processor, system memory, or communications feature or other components as desired.

The GPS receiver 220 is in communication with GPS satellites and can discover the specific location of the mobile delivery device 110 through its communications with the GPS satellites. In some embodiments the GPS receiver 220 uses other position determining systems to determine its exact location, such as GLONASS, COMPASS, multilateration, Wi-Fi detection, triangulation, or LORAN. In some embodiments, the GPS receiver 220 records the location of the mobile device periodically, such as at a specific time interval.

The device link 230 can comprise circuitry and/or other components to establish a Bluetooth® communication link, R/F communication link, or other wireless or wired communication link. In some embodiments, the device link 230 is used to establish a communication link with lock 140 or fob 150. In some embodiments, the device link 230 is used to transmit the cryptographic information from the mobile delivery device 110 to the lock 140 and/or to the fob 150.

The display 240 can be a display screen, touch screen, or other method of displaying information. In some embodiments, the display 240 can display information received from the various databases 120 or other information to the user. For example, the display 240 can display information from the delivery conditions database 123, directions, warnings, alerts, and any other desired information.

The input device 250 can be a keyboard, touch screen, hard keys, soft keys, a scanner, or the like. The input device 250 can be used by the user of the mobile delivery device 110 to control the operations of the mobile delivery device 110.

The communications device 260 may communicate via cellular networks, WLAN networks, or any other wireless or wired network. The communications device 260 can be used to receive or send information to the databases 120 or any other peripheral device that the mobile delivery device 110 may need to communicate with.

In some embodiments, the mobile delivery device 110 can also contain a camera 270. In some embodiments, camera 270 can be used to take pictures and store them in the mobile device memory or transmit them to the delivery conditions database 123. In some embodiments, the pictures taken by the camera can comprise delivery conditions information. In some embodiments, the camera can also be used to scan barcodes, QR codes, or other visual identifiers. The mobile delivery device 110 can then use this information to identify items that are being delivered. In some embodiments, the mobile delivery device 110 can use a dedicated scanner instead of the camera to scan barcodes, QR codes, or other visual identifiers.

Figure 3:
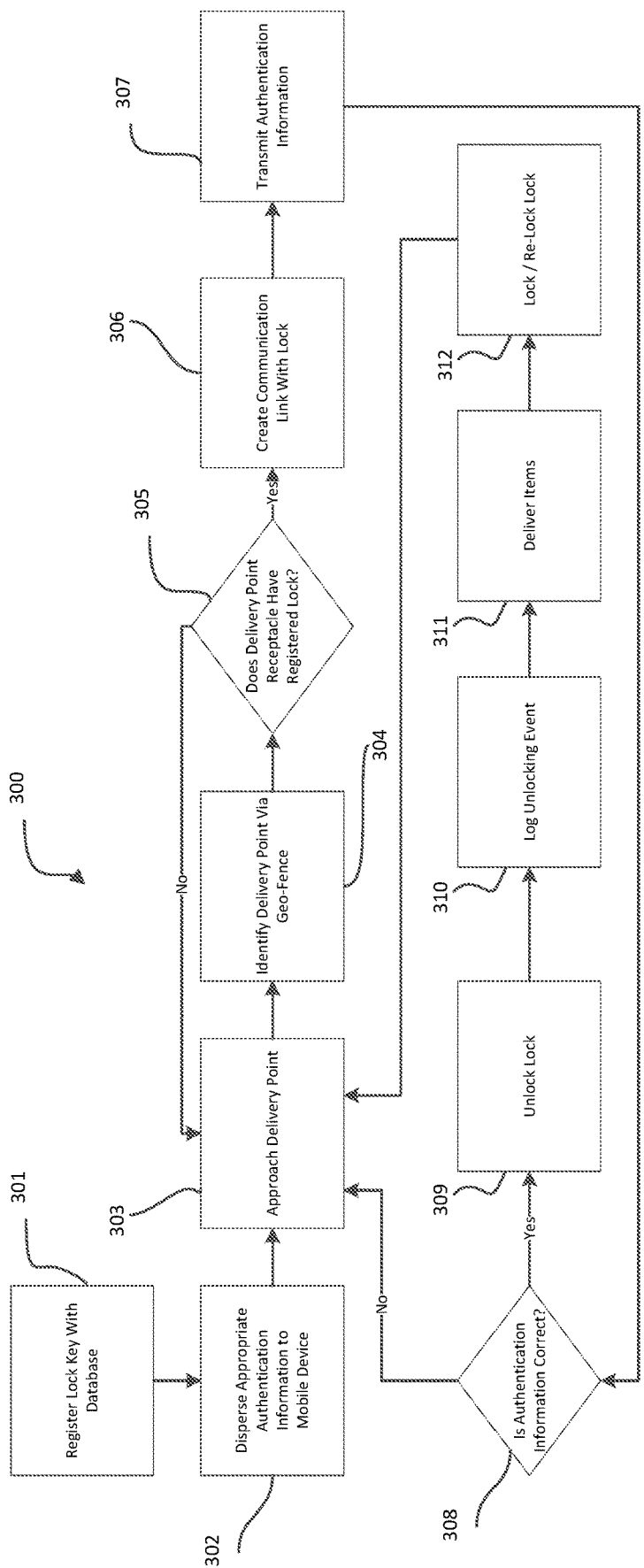
FIG. 3 is a block diagram depicting a process for using the mobile device to unlock a secure delivery point.

FIG. 3 is a flow chart depicting an exemplary process for using the mobile delivery device 110 to unlock a lock 140. The process starts with the process block 301. In process block 301, the lock 140 is registered with the lock database 122. In some embodiments, the lock 140, which can include the lock ID, is logged with the lock database 122 using the user/lock interface 130. Registering the lock 140 with the database can comprise inputting a lock ID into the user/lock interface 130. The user/lock interface 130 can communicate the lock ID, along with any cryptographic information to the lock database 122. Registering the lock 140 with the user/lock interface 130 can include scanning a code on the lock, or on the lock packaging using a user's mobile device and an application. Registering the lock 140 can also include a third party, such as the lock manufacturer, sending lock information, for example, cryptographic information, to the lock database 122. The user registering the lock 140 will also input an address or delivery point information to associate with the lock 140 so the distribution network can identify the lock and obtain, prepare, or create the required cryptographic information for locking and unlocking the lock 1240. The process 300 then proceeds to process block 302.

In process block 302, the appropriate cryptographic information, such as encryption keys, tokens, or the like, are sent to the mobile delivery device 110 for each of the locks 140 along the delivery route. In some embodiments, the lock database 122 sends the appropriate cryptographic information to the mobile delivery device 110. In some embodiments, the lock database 122 sends all the cryptographic information for every lock 140 that is used to secure a delivery point along the route of the item deliverer using the mobile delivery device 110. In some embodiments, the lock database 122 also sends a list of the delivery points that are associated with the locks that the mobile delivery device 110 is receiving keys for. In some embodiments, the lock database 122 only sends a single encryption key to the mobile delivery device 110. In this embodiment, the mobile delivery device 110 can periodically send its location to the lock database 122. Then the lock database 122 sends the cryptographic information for the lock for the delivery point that the mobile delivery device 110 is approaching. To determine whether the mobile delivery device 110 is approaching a specific geofence, the server 101 and/or the mobile deliver device 110 can use current speed and location of the mobile delivery device 110 to determine, for example, where the mobile delivery device will be in a given amount of time. The given amount of time may be less than 1 minute, 1 minute, 5 minutes, or more, or any other desired time. In some embodiments, the server 101 and/or the mobile computing device can determine that the mobile delivery device 110 is approaching a geofence for a given delivery point when the mobile delivery device enters the geofence for the immediately preceding or other preceding delivery point along a route. In some embodiments, the server 101 and/or the mobile computing device can determine that the mobile delivery device 110 is approaching a geofence for a given delivery point when the mobile delivery device exits the geofence for the immediately preceding delivery point along the delivery route. The lock database 122 then sends the cryptographic information for each lock 140 as the mobile delivery device 110 as the mobile device 100 approaches the delivery point associated with the lock. The process then proceeds to process block 303.

In process block 303, the user of the mobile delivery device 110 approaches a delivery point. In some embodiments, the mobile delivery device 110 tracks its own location by periodically recording its location using the GPS receiver 220. In some embodiments, the mobile device periodically transmits its location to geofence database 121. The mobile delivery device 110 identifies, based on its location and the information from the geofence database 121, which delivery point is being approached. In some embodiments, this process occurs on the mobile delivery device 110. The process moves to block 304.

In process block 304, the mobile delivery device 110 determines the identity of the delivery point it. In some embodiments, the mobile delivery device 110 determines what delivery point it has approached by comparing its location to the various geofences associated with delivery points stored in the memory of the mobile delivery device 110. In some embodiments, the mobile delivery device 110 transmits its location to the geofence database 121. Then the geofence database 121 determines what delivery point it at by comparing its location to the various geofences associated with delivery points stored in the memory of the geofence database 121 and transmits that delivery point to the mobile delivery device 110. The process then proceeds to decision block 305.

In decision block 305, the system determines whether or not the delivery point has a receptacle that is locked with a lock registered in the lock database 122. In some embodiments, the mobile delivery device 110 determines this from the list of lock information it received from the lock database 122. In other embodiments, the lock database 122 can determine whether or not a lock is registered with a delivery point by receiving the current delivery point from the mobile delivery device 110 or directly from the geofence database 121. If there is no registered lock 140 at the delivery point, the process returns to process block 303. If there is a registered lock 140, then the process proceeds to process block 306.

In process block 306, the mobile delivery device 110 creates a communication link with the lock 140 at the delivery point. Is some embodiments, this link is a Bluetooth® link or RF link. The process then proceeds to process block 307.

In process block 307, the mobile delivery device 110 transmits the cryptographic information, such authentication information or an encryption key, associated with the delivery point to lock 140. The process then proceeds to decision block 308.

In decision block 308, the lock 140 determines whether the authentication information is correct for the lock 140. If the authentication information is incorrect the process 300 returns to process block 303. If the authentication information is correct, a cryptographic handshake is completed with the lock 140 and the mobile delivery device 110. The process proceeds to process block 309.

In process block 309, the lock 140 unlocks, allowing the carrier using the mobile delivery device 110 access to the delivery receptacle. The process then proceeds to process block 310.

In process block 310, the lock 140 logs an unlock event in its internal memory. In some embodiments, the lock 140 can also transmit this unlock event to an external database for storage, using some form of wired or wireless communication. In some embodiments, the unlock event contains data regarding what time the lock was unlocked, what method was used to unlock the lock (i.e. key, keypad, transmitted encryption key, or the like), and who unlocked the device. In some embodiments, the lock can determine who unlocked the device by receiving a mobile device token from mobile delivery device 110 that designates what mobile device transmitted the encryption key. The process then proceeds to process block 311.

In process block 311, the user of the mobile delivery device 110 places the items for delivery at the delivery point into the delivery receptacle previously locked by lock 140. The process then proceeds to process block 312

In process block 312, the user of the mobile delivery device 110, relocks the lock 140 on the delivery receptacle at the delivery point. In some embodiments, the user of mobile delivery device 110 relocks the lock by closing the opening or door on the delivery receptacle and the lock 140 reengage automatically. In some embodiments, the mobile delivery device 110 could also send a command to relock the lock 140 over the communication link. The process then returns to process block 303.

Figure 4A:
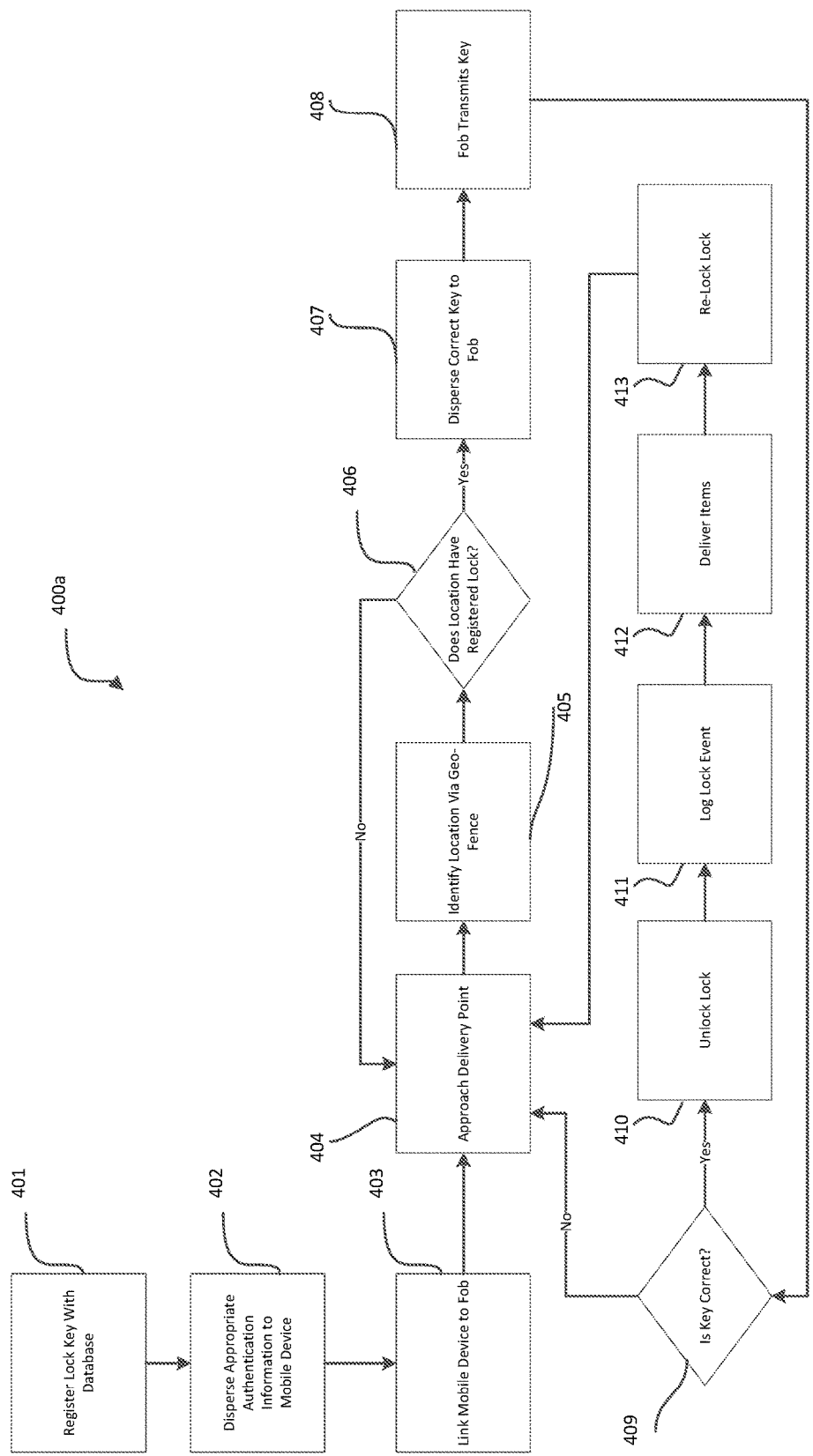
FIG. 4a is a block diagram depicting a process for using the mobile device to unlock a secure delivery point using a fob.

FIG. 4*a* is a block diagram depicting one embodiment of a process for using the mobile delivery device 110 to unlock a secure delivery point in conjunction with a fob 150. This process can be similar to the process 300 depicted in FIG. 3. In process 400*a*, the mobile delivery device 140 works in conjunction with a fob 150. The process FIG. 4 starts with process block 401. In process block 401, the lock 140 is registered with the lock database 122. This can be similar to process block 301. The process then proceeds to process block 402.

In process block 402, the appropriate cryptographic information, such as authentication information or encryption keys are sent to the mobile delivery device 110, similar to process block 302 from FIG. 3. The process block then proceeds to process block 403.

In process block 403, the mobile delivery device 110 establishes a communication link with fob 150. In some embodiments, mobile delivery device 110 establishes a Bluetooth or R/F link with fob 150 using device link 230.

The process the proceeds to process block 404, process block 405 and decision block 406, similar to the process 300 described with regard to FIG. 3 process blocks 303-305.

In process block 407, the correct key for the lock that associated with the current delivery point is dispersed to fob 150. In some embodiments, the mobile delivery device 110 transmits the key to fob 150 over the communications link that was previously established in process block 403. In some embodiments, the mobile delivery device 110 only transmits a partial key to the fob and keeps the rest of the key at the mobile device.

The process then proceeds to process block 408. In process block 408, fob 150 transmits the key to lock 140. In the embodiments where the fob does not have the entire encryption key, the mobile delivery device 110 also connects to the lock and transmits a portion of the encryption key in a manner similar to as described in FIG. 3.

The process 400 then proceeds in a manner similar to FIG. 3 through decision blocks 409 (similar to decision block 308), process block 410 (similar to process block 309), process block 411 (similar to process block 310), process block 412 (similar to process block 311), and process block 413 (similar to process block 312). However, in process block 411, instead of the lock 140 receiving a token from mobile delivery device 110, the lock could receive a token from fob 150.

Figure 4B:
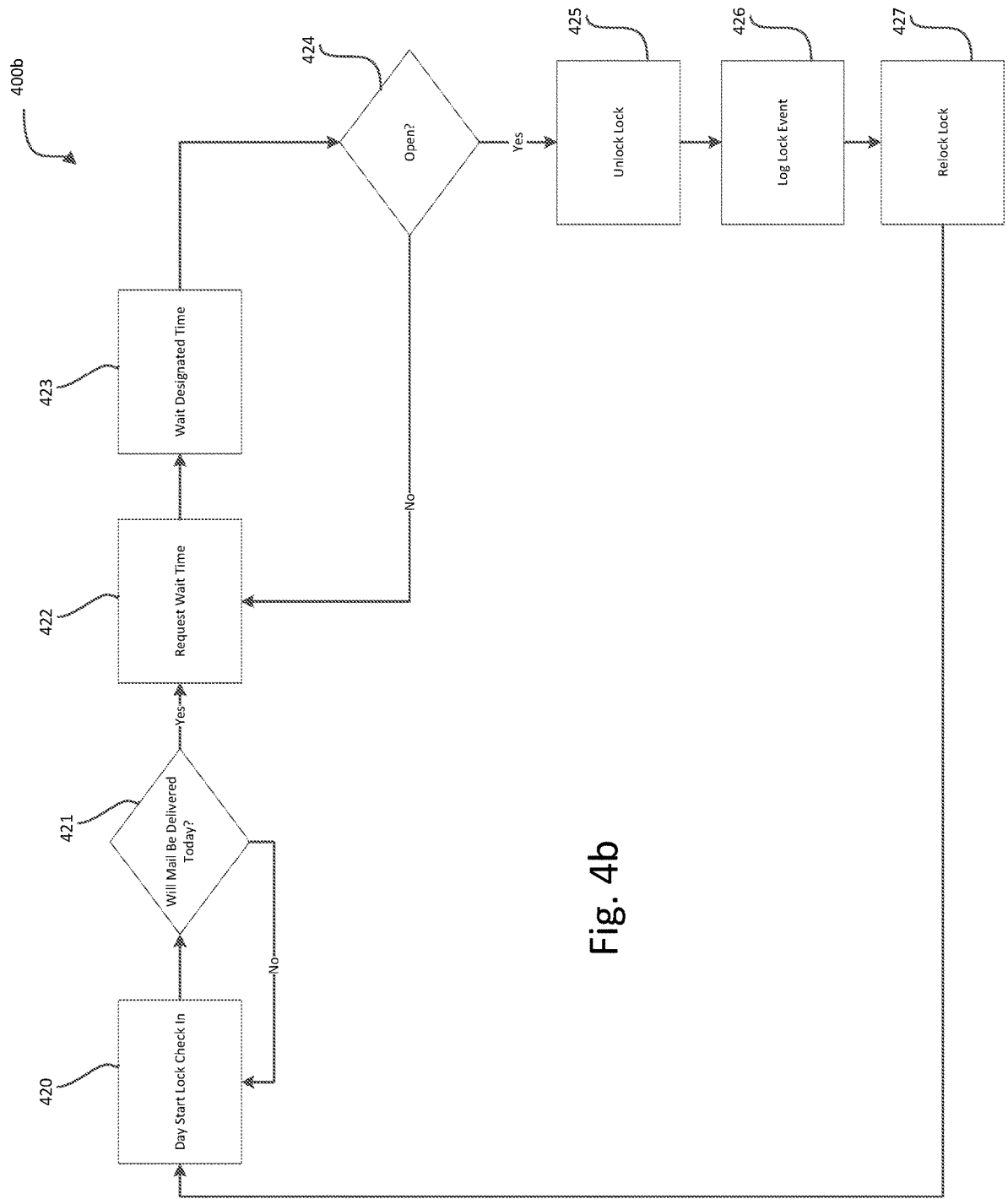
FIG. 4b is a block diagram depicting a portion of an automated system of opening a lock based on a mobile device location.

FIG. 4*b* is a block diagram depicting a method of unlocking a lock remotely based on the mobile device's location. FIG. 4*b* depicts process 400*b* from the lock 140's perspective. The process starts at process block 420. In process block 420, the lock 140 performs a day start lock check in. In this embodiment, the lock 140 uses wireless or wired communication to establish communication with the server 101. In some embodiments, the lock 140 performs this check in at the beginning of a new day, before any mail or other items could possibly be delivered. In some embodiments, the lock 140 performs this check in at 2:00, 3:00, 4:00, or 5:00 AM. In some embodiments, the lock 140 can send system information about the lock to the server 101. For example, the lock could send the current temperature, state of battery charge, and any system failures. In some embodiments the server 101 can then relay that information to any carriers or recipients. For example, the server 101 could use the user lock interface 130 to send a message that the user needs to change the battery on the lock 140 or that communication could not be established with lock 140. The process then proceeds to decision block 421.

In decision block 421, the lock 140 in conjunction with the server 101 determines whether any mail will be delivered to the delivery point where the lock 140 is. In some embodiments, lock database 122 determines which delivery point the lock 140 is securing and sends this information to item information database 124, which then determines if mail or other items will be delivered to the delivery location secured by lock database 140. If items are going to be delivered, the process then proceeds to process block 422. If no items will be delivered, the lock 140 can enter into a low power consumption state and then return to process block 420.

In process block 422, the lock 140 requests a wait time from the server 101 before the lock 140 contacts the server 101 again. The server 101 calculates the wait time based upon the current location of the mobile device and what the expected delivery time is for any items going to the delivery point secured by the lock 140. More details on the wait time will be provided below. The process then proceeds to process block 423.

In process block 423, the lock 140 enters a low power consumption state and waits the designated time. The process then proceeds to decision block 424.

In decision block 424, the lock 140 queries the server 101 to determine if it should open. In some embodiments, the mobile delivery device 110 determines whether it is within a designated area around the lock 140's delivery point using geofence database 121. In some embodiments, this area can be within five meters of the delivery point. If the mobile delivery device 110 is within the area, the server 101 or the mobile delivery device 110 sends an open command to lock 140. If lock 140 receives an open command, the process then proceeds to process blocks 425. Otherwise the process returns to process block 422.

In process blocks 425-427, the lock 140 unlocks based on the open command, logs the unlock event, and relocks in a manner similar to what was described previously. However, in some embodiments, if the delivery point that the lock 140 is securing is not ever opened, such as when no mail or other item is delivered, the lock 140 will automatically relock after a period of time, for example, in ten minutes. In some embodiments, the time the lock will wait to automatically relock can depend on the size of the geofence used to mark the delivery point. For example, if the geofence is a mile all around the delivery point, then the lock 140 can wait an hour before relocking, if the geofence is 5 meters, the lock 140 can wait 10 minutes. In some embodiments, the lock will re-lock when the mobile delivery device 110 has exited the geofence associated with the delivery point where the lock 140 is located.

Figure 4C:
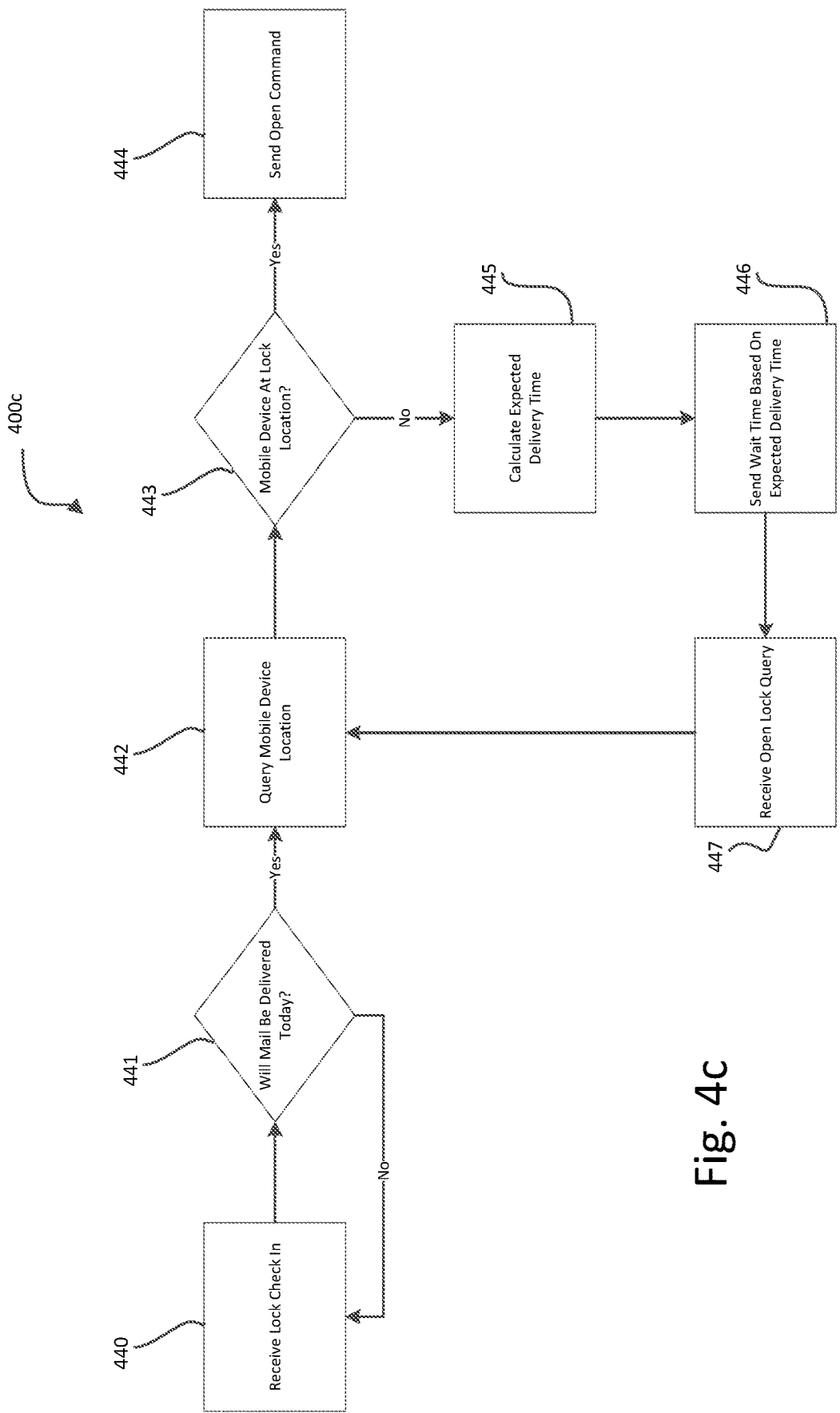
FIG. 4c is a block diagram depicting a portion of an automated system of opening a lock based on a mobile device location.

FIG. 4c is a block diagram depicting a method of unlocking a lock remotely based on the mobile device's location. FIG. 4c depicts a process 400c from the databases' 120 perspective. The process 400c starts with process block 440. In process block 440, the server 101 receives the lock check-in as previously described. The process then proceeds to decision block 441.

In decision block 441, the server 101 determine if the delivery point secured by the lock 140 is going to receive any items today in the manner previously described. The process then proceeds to process block 422.

In process block 442, the server 101 queries the mobile delivery device 110's location. In some embodiments, geofence database 121 determines the mobile delivery device 110's location by receiving a GPS coordinate from the mobile delivery device 110. The geofence database 121 can then use this coordinate to determine whether the mobile delivery device 110 is within any geofence. The process then proceeds to decision block 443.

In decision block 443, the server 101 determine whether the mobile device is at the delivery point secured by the lock 140. In some embodiments, this is determined by setting up a geofence within 5 meters of the lock's location. In other embodiments, the geofence can be as large as an entire mile. If the lock is in the correct area, the process proceeds to process block 444, where an open command is sent to the lock by server 101. Otherwise, the process proceeds to process block 445.

In process block 445, an expected delivery time is calculated based upon the current location of the mobile delivery device 110, the route the mobile delivery device 110 is on, and the items to be delivered. For example, if the mobile delivery device 110 is on the $3^{rd}$ stop in the route and the lock is securing the $5^{th}$ stop, then the estimated delivery time could be in 30 minutes. If the lock is on the $20^{th}$ stop, it could be 2 hours. A more detailed description of how to calculate expected delivery times is described in U.S. patent application Ser. No. 15/398,313, filed Jan. 4, 2017, hereby incorporated in its entirety by reference. The process then proceeds to process block 446.

In process block 446, the server 101 calculate an appropriate wait time for the lock 140 to wait before contacting the server 101 again or before requesting the location of the mobile delivery device 110 again. The server 101 can then send the wait time to the lock 140. The appropriate wait time is based on how close the expected delivery time is to the actual delivery time, as well as the location of the mobile device. For example, if the expected delivery time is 6 hours away, the databases 120 can send a wait time of 3 hours. As the expected delivery time gets closer and the mobile device get closer to the delivery point, the wait time gets correspondingly shorter. For example, if the expected delivery time is 2 hours, the wait time is 1 hour. If the expected delivery time is 5 minutes, the wait time is 20 seconds. If the mobile device is within 20 meters, the wait time could be 1 second. It should be understood that these wait times are examples and that the wait times could be any variation of the above. The process then proceeds to process block 447. In some embodiments, the wait time is not related to an estimated delivery time, but is based on a location of the mobile delivery device. For example, if the mobile delivery device 110 is far from the lock 140, or if the mobile delivery device 110 is still a number of delivery points away from the lock 140, the wait time is longer. As the mobile delivery device nears the lock 140, the wait times can get progressively shorter. The wait times can also be based on whether the lock 140 is powered by a battery or is hardwired to an electrical system. A person of skill in the art guided by the present disclosure, will understand how to determine desirable wait time intervals based on the location of the mobile delivery device 140.

In process block 447, the server 101 receive an open lock query from the lock 140 after the designated wait time has passed. The process then returns to process block 442.

Figure 5:
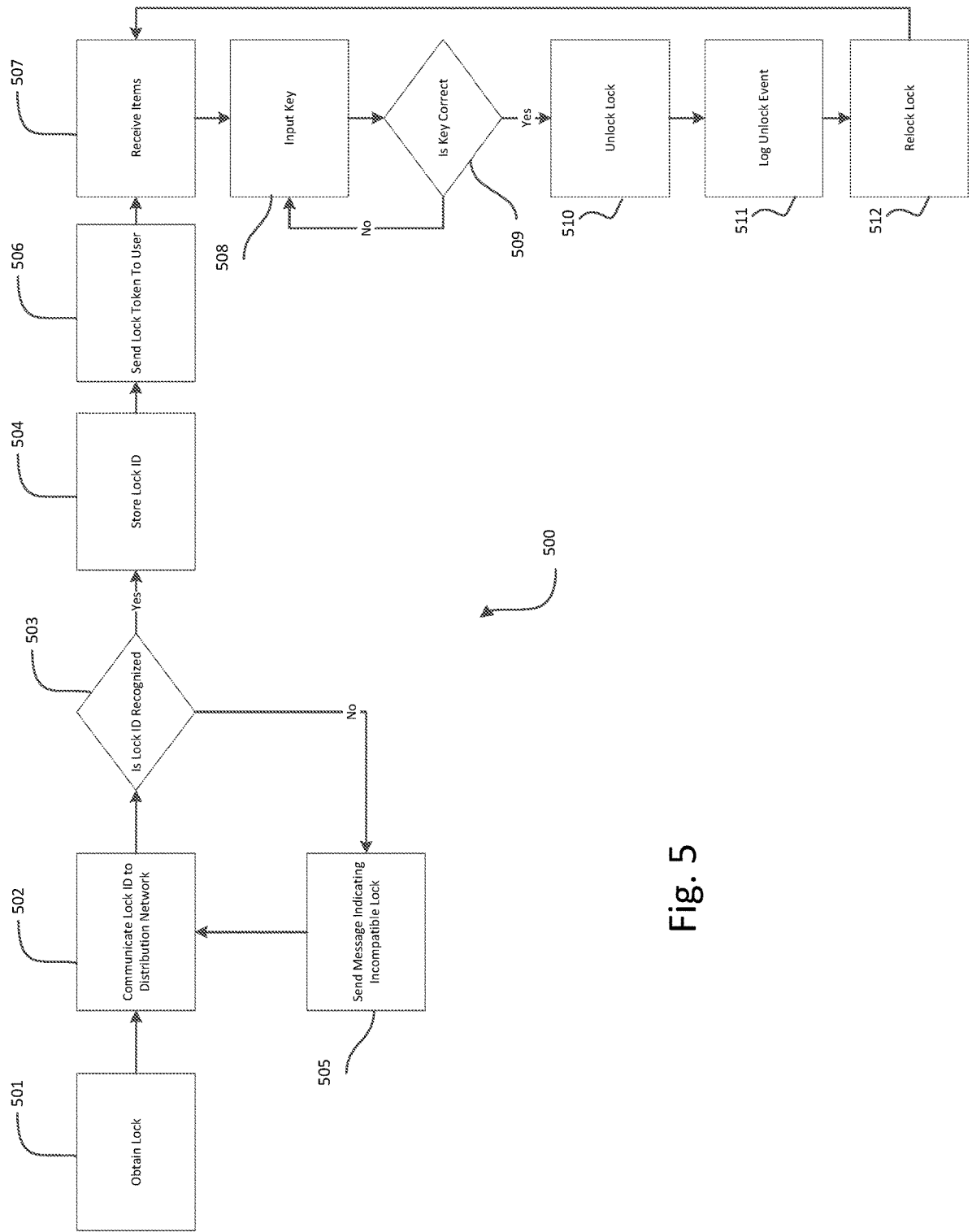
FIG. 5 is a block diagram depicting a process for an item receiver to set up and receive items from a secure location.

FIG. 5 depicts a block diagram of a process 500 for user or item recipient to set up and receive items at a secure receptacle. The process starts with process block 501. In process block 501, the item receiver obtains a lock 140 that is compatible with the system described in FIG. 2. In some embodiments, the item receiver can purchase a delivery receptacle with the lock 140 pre-installed in it. In other embodiments, the item receiver can purchase a lock 150 separately from the delivery receptacle and then install the lock into the receptacle. The process then proceeds to process block 502.

In process block 502, the item receiver communicates the lock ID to the distribution network. In some embodiments, the distribution network is the system as displayed in system 100. In some embodiments, the lock ID is a unique alphanumeric code assigned to each lock at manufacture that designates the lock. In some embodiments, the distribution network recognizes the lock ID and already has the correct encryption key to unlock the lock stored from the time of the lock manufacture. In other embodiments, the item receiver can send the correct encryption key to the distribution network along with the lock ID. In some embodiments, the item receiver also sends the address of the delivery point that will be associated with the lock 140 to the distribution network. In some embodiments, the lock database 122 stores all the information that was received from the item receiver about the lock.

In some embodiments, the item receiver uses the user/lock interface 130 to transmit the various pieces of lock information to the distribution network. In some embodiments, the user/lock interface 130 is a website or similar system accessed by a personal computer, phone or the like. The user enters the lock ID and the associated delivery point or addresses for the lock into the website, which then registers the lock ID with the lock database 122. In some embodiments the user/lock interface 130 is an app on a smartphone or similar device. In some embodiments, the app can be used to register the lock ID with the lock database 122 by scanning a QR or barcode or similar image on the lock. This can generate the correct lock ID in the app which then communicates the lock ID to the lock database 122. Alternatively, the lock can communicate the lock ID to the app via Bluetooth, R/F link, or some other form of wireless communication. In some embodiments, once the lock ID is received, the user can then enter the associated delivery point or address. In other embodiments, the user can scan the lock ID while at the delivery point or address that the user wants to be associated with the lock. The app can then enter the current location as the delivery point or address by using the current location calculated by the smartphone or similar device. The process then proceeds to decision block 503.

In decision block 503, the distribution network determines if the lock ID is recognized. In some embodiments, the lock database 122 determines whether or not the ID is recognized. In some embodiments, the lock database 122 determines whether the lock ID is recognized because the lock database 122 has all the lock IDs already stored for all manufactured compatible locks. In other embodiments, the lock database 122 determines that the lock ID is recognized because it is in the proper format (e.g. the proper number of alpha numeric characters arranged in the correct way) and/or some portion of the lock ID designates it as a correct lock. If the lock ID is recognized the process then proceeds to process block 504, otherwise the process block proceeds to process block 505.

In process block 505, the distribution system sends a message to the item receiver informing the item receiver that the lock ID does not designate a lock compatible to the system. In some embodiments, the lock database 122 sends this message through the user/lock interface 130. In some embodiments, the message is sent to the user via the website or app that the user used in his or her attempt to register the lock. The process then returns to process block 502.

In process block 504, the distribution network stores the lock ID and all the other information that was received along with the lock ID. This information can be stored in lock database 122. The process then proceeds to process block 506.

In process block 506, the server 101 sends cryptographic information to the recipient. In some embodiments, the lock token contains the encryption key necessary for the user to open the lock via Bluetooth or R/F pairing. In some embodiments, the user receives this token via the user/lock interface 130. In other embodiments, the recipient can open lock 140 via an electronic pin pad or through the use of a key. In those embodiments, process block 506 can be omitted. The process then proceeds to process block 507.

In process block 507, the item is delivered to the receptacle in a manner similar to that described with regard to FIG. 3 or FIG. 4. The process then proceeds to process block 508.

In process block 508, the item receiver inputs the key into lock 140. In some embodiments, the item receiver can use a mobile phone or similar device and create a Bluetooth or R/F link with the lock 140 and transmit an encryption key to lock 140. In some embodiments, the encryption key was received by the item receiver with the lock token sent to the item receiver in process block 506. In other embodiments, the user can instead input the key using an electronic pin pad or using an actual physical key. The process the proceeds to decision block 509.

In decision block 509, the lock 140 determines if the key it received from the user is correct. For example, the lock 140 could compare the received encryption key or the pin it received from an electronic pin pad to the correct key or pin stored in memory to determine if it should unlock. In embodiments where the user uses a physical key, this step is unnecessary. If the key is correct, the process proceeds to process block 510, otherwise it returns to process block 508.

In process block 510, the lock 140 unlocks, providing access to the delivery receptacle. The process then proceeds to process block 511.

In process block 511, the lock 140 logs the unlock event in manner similar to the way described in FIG. 3. The process then proceeds to process block 512, where the lock is relocked in a similar manner as described in FIG. 3.

Figure 6:
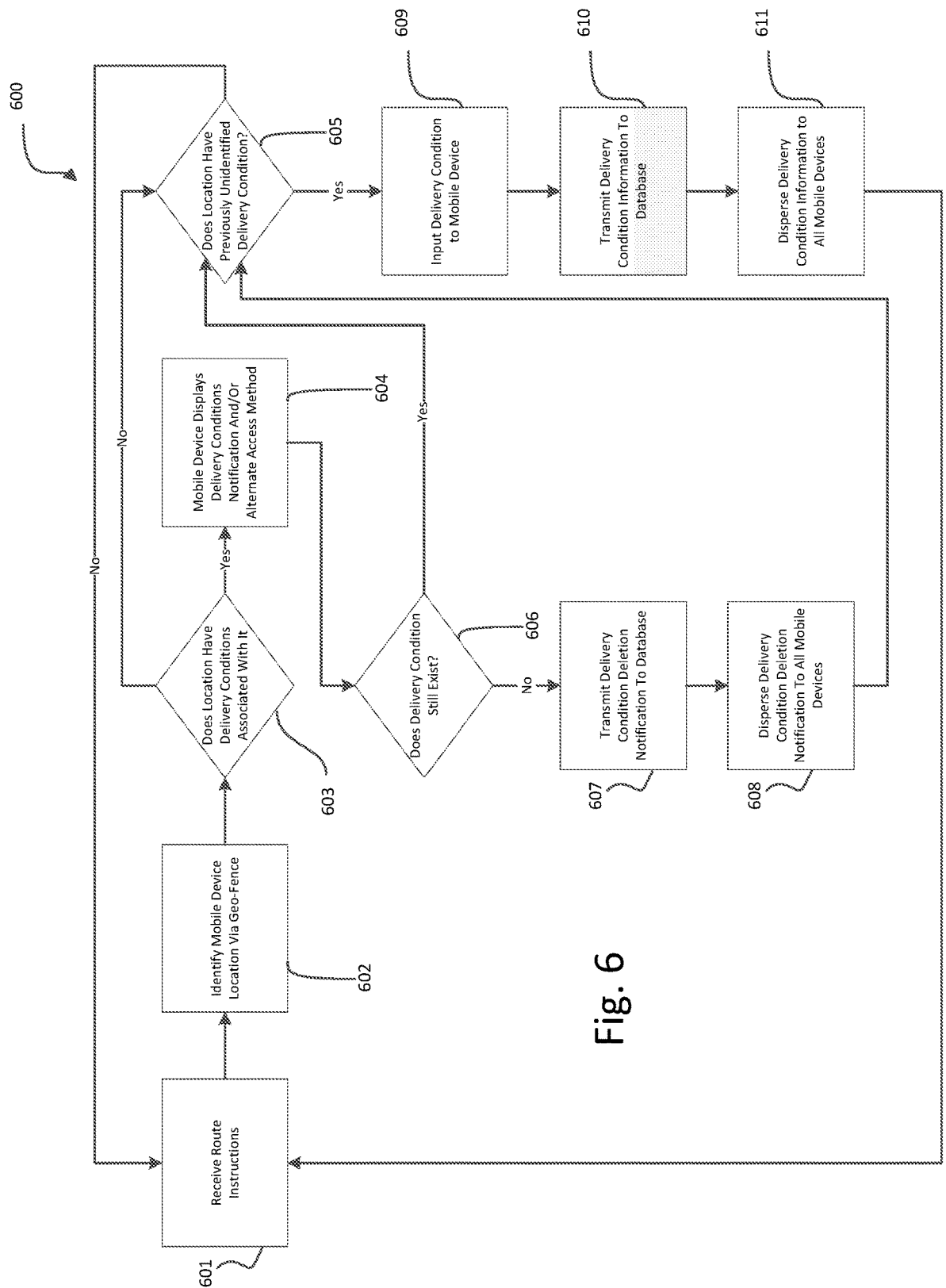
FIG. 6 is a block diagram depicting a process for using a mobile device to display and manage route delivery conditions.

FIG. 6 is a block diagram depicting one embodiment of a process 600 for using a mobile device to display and manage route delivery conditions. The process starts in process block 601. In process block 601, the user of the mobile delivery device 110 receives route instructions. In some embodiments, the route instructions take the form of the ordered series of delivery points that the carrier using the mobile delivery device 110 will be delivering items to. In some embodiments, the route instructions are transmitted from the item information database 124 to the mobile delivery device 110. In some embodiments, the various delivery conditions for the route are dispersed from delivery conditions database 123. In other embodiments, the mobile device already contains information about all of the delivery conditions but only activates alerts for the delivery points, address, or locations along the route it received. The process 600 then proceeds to process block 602.

In process block 602, the mobile delivery device 110 in conjunction with geofence database 121 determines the location of the mobile delivery device 110 in the manner as previously described. The process 600 then proceeds to decision block 603.

In decision block 603, the system determines whether the mobile delivery device 110's current location has any delivery conditions associated with it, or whether the mobile delivery device 110 is approaching a geofence associated with a delivery condition stored in the delivery condition database 123. In some embodiments, the mobile delivery device 110 sends a request to the delivery conditions database 123 for any delivery conditions associated with the mobile device current location or with an upcoming location. The delivery conditions database 123 then returns information on any delivery condition for the location it has stored in memory. In other embodiments, the mobile device can receive all the delivery condition information for every location along its route from delivery conditions database 123 at the same time it receives route information. In this embodiment, the mobile delivery device 110 itself compares its location to the location of all of the delivery conditions information it already received and determines whether any delivery conditions are present. If delivery conditions are present, the process proceeds to process block 604. Otherwise the process 600 proceeds to decision block 605.

In process block 604, the mobile delivery device 110 displays a delivery conditions notification and/or alternate access method. For example, if the delivery condition associated with the location was that the delivery receptacle was in an unusual or difficult to find location, the mobile delivery device 110 could display a message regarding where the delivery receptacle is and a picture of the location. If the delivery condition is road work blocking a delivery point, the mobile device could display an alternate way to access the delivery point, such as by turning down different streets. In some embodiments, the mobile delivery device 110 could receive this route from the item information database 124. The alert on the mobile delivery device 110 can be an audible alert, a visual alert, a vibration, and/or any other desired alert mechanism. The process 600 then proceeds to decision block 606.

In decision block 606, the carrier of the mobile delivery device 110 determines whether the delivery conditions still exist. The carrier can select an option on the mobile delivery device 110 confirming the existence or non-existence of the delivery condition. If the conditions still exist, then the process goes to decision block 605. Otherwise the process goes to process block 607.

In process block 607, the item deliverer transmits a delivery condition deletion notification to the delivery conditions database 123. In some embodiments, the carrier uses mobile delivery device 110 to send this notification. For example, when mobile delivery device 110 displays delivery conditions, the user of the mobile delivery device 110 could then select the displayed delivery conditions on the mobile device and hit a delete option. The mobile delivery device 110 could then transmit the deletion notification to delivery conditions database 123. The process then proceeds to process block 608, In process block 608, the delivery conditions database 123 disperses the notification to delete a particular piece of delivery conditions information to each mobile delivery device 110 connected to the database. In some embodiments, the changes to the delivery conditions are dispersed through wireless communications such as Wi-Fi or cellular links to the delivery conditions database 123. In other embodiments, the changes are dispersed through the charging stands the of mobile devices. In some embodiments, the delivery conditions database only sends this notification to the mobile devices 110 that had previously received this delivery conditions information. The process then proceeds to decision block 605.

In decision block 605, the user of the mobile delivery device 110 determines if there are previously unidentified delivery conditions. The process 600 can arrive at decision block 605 at any point during the delivery process, for example, whether or not there have been other delivery conditions. This decision block 605 is described here for convenience. For example, if the delivery point to which the carrier is delivering items has a new dog or new mailbox location, the carrier could determine that this is a new delivery condition. If there is a newly identified delivery condition, the process proceeds to process block 609. Otherwise, the process returns to process block 601. In some embodiments, decision block 605 and related process blocks can be omitted from process 600.

In process block 609, the user of the mobile delivery device 110 inputs information about the newly identified delivery condition into the mobile delivery device 110. In some embodiments, the user could use input device 250 to enter notes about the delivery conditions into the mobile delivery device 110 as well as using camera 270 to take pictures of the delivery conditions. In some embodiments, the mobile device associates this information with the location of the mobile device as previously identified in process block 602. The process then proceeds to process block 610.

In process block 610, mobile delivery device 110 sends information that was inputted into the mobile delivery device 110 about the delivery conditions to the delivery conditions database 123. The process then proceeds to process block 611.

In process block 611, the delivery conditions database 123 disperses the new delivery conditions information to each mobile delivery device 110 connected to the database. In some embodiments, the delivery conditions database only sends this notification to the mobile devices 110 that will be visiting the location where the delivery conditions were collected. In some embodiments, the changes to the delivery conditions are dispersed through wireless communications such as Wi-Fi or cellular links to the delivery conditions database 123. In other embodiments, the changes are dispersed through the charging stands the of mobile devices. The process then returns to process block 601.

Figure 7:
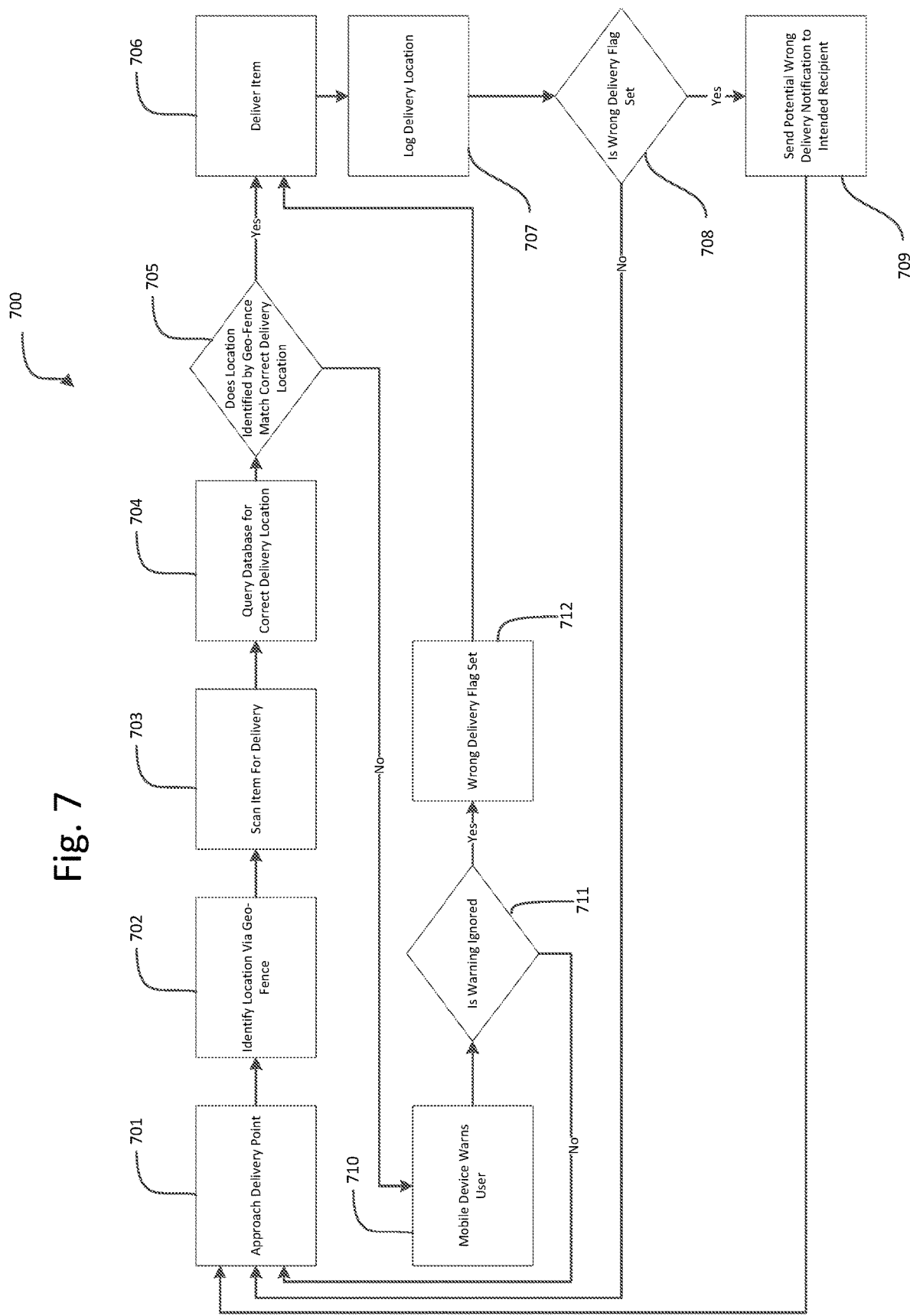
FIG. 7 is a block diagram depicting a process for using a mobile device to display a wrong delivery location notification.

FIG. 7 is a block diagram depicting one embodiment of a process 700 for using a mobile device to display a wrong delivery location notification. The process begins with process block 701, where the user of the mobile delivery device 110 approaches a delivery point. The process then proceeds to process block 702.

In process block 702, the mobile delivery device 110 determines its location via geofence as described previously. The process 700 then proceeds to process block 703.

In process block 703, the mobile delivery device 110 can scan a barcode, QR code, or other visual identifier on the item to determine exactly what item it is. In some embodiments, the barcode, QR code, or other visual identifier represents a unique alpha-numeric code that identifies the item. In some embodiments, the mobile device uses camera 270 to perform this scan. The process 700 then proceeds to process block 704.

In process block 704, the mobile delivery device 110 queries the item information database 124 for the correct delivery location for the item identified to the scan. The item information database 124 then returns the correct location to the mobile delivery device 110. The process 700 then proceeds to decision block 705.

In decision block 705, the mobile device compares the correct delivery location it received from item information database 124 to the location of the mobile delivery device 110 it determined via geofencing in process step 702. If the location matches, the process proceeds to process block 706. Otherwise the process 700 proceeds to process block 710.

In process block 710, the mobile delivery device 110 warns use that the item is being delivered to the wrong location. In some embodiments, the mobile delivery device 110 warns the user by displaying a warning message on the screen of mobile delivery device 110. In some embodiments, the warning message also allows the user to select whether he is following or ignoring the warning. The process 700 then proceeds to decision block 711.

In decision block 711, the mobile delivery device 110 determines whether the user ignored the wrong delivery warning. In some embodiments, the mobile delivery device 110 determines whether the warning is ignored by determining whether the user selected ignore warning when it was displayed. If the warning was not ignored, then the process returns to process block 701. Otherwise the process 700 proceeds to process block 712.

In process block 712, a wrong delivery flag is set for the item. In some embodiments, the mobile delivery device 110 sets this wrong delivery flag by communicating to item information database 124 that a potential wrong delivery occurred. The item information database 124 then stores a flag in its memory associated with the potentially wrongly delivered item. The process 700 then proceeds to process block 706.

In process block 706, the user of the mobile delivery device 110 delivers the item that was previously scanned. The process 700 then proceeds to process block 707.

In process block 707, the actual delivery location of the item is logged. In some embodiments, the user of the mobile delivery device 110 can input into the mobile delivery device 110 that the item was delivered and then the mobile delivery device 110 sends a notification to item information database 124 that the item was delivered at the location that the mobile device is currently at as determined in process block 702, the 700 then proceeds to decision block 708.

In decision block 708, the item information database 124 determines whether a wrong delivery flag has been set on the item that was just delivered. If the flag is set, the process 700 proceeds to process block 709. Otherwise, it returns to process block 701.

In process block 709, the item information database 124 sends a potential wrong delivery notification to the intended recipient of the item with the wrong delivery flag. In some embodiments, this notification could take the form of an email or text message. In some embodiments, the message can also ask the intended recipient to confirm whether they received the item or not. The process 700 then returns to process block 701

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further, each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A system for item delivery to secured receptacles comprising:
   a mobile computing device comprising a location module, and storing a mobile device identifier, and a route identifier corresponding to a route assigned to the mobile computing device, wherein the location module detects the geographic position of the mobile computing device;
   a server in communication with the mobile computing device, the server configured to:
      receive the route identifier and the mobile device identifier from the mobile computing device;
      identify one or more electronic locks located along the route to which the mobile computing device is assigned;
      broadcast the mobile device identifier to the plurality of locks;
   a memory in communication with the server, the memory storing identity of the one or more electronic locks securing the receptacles;
   wherein the mobile computing device is configured to:
      communicate the mobile device identifier, an unlock key, and an unlock command to the identified one or more electronic locks located along the route based on the detected geographic position of the mobile computing device.

2. The system of claim 1, wherein the mobile computing device is configured to receive the unlock key from the server based on the detected geographic position of the mobile computing device.

3. The system of claim 1, wherein the mobile computing device further stores a a carrier identifier corresponding to a carrier assigned to the route.

4. The system of claim 1, wherein the one or more electronic locks are configured to open upon receipt of the unlock key, the mobile computing device identifier, and the unlock command.

5. The system of claim 1, wherein the mobile computing device comprises a mobile delivery device and a fob.

6. The system of claim 5, wherein the mobile computing device is configured to store a first portion of the unlock key on the fob and a second portion of the unlock key on the mobile delivery device.

7. The system of claim 6, wherein the one or more electronic locks are configured to receive the first portion of the unlock key from the fob and the second portion of the unlock key from the mobile delivery device in order to unlock.

8. The system of claim 1, wherein the mobile computing device is configured to communicate the mobile device identifier, the unlock key, and the unlock command to the one or more electronic locks when the mobile computing device is within a geofence of the one or more electronic locks.

9. A method for item delivery to secured receptacles comprising:
   detecting, via a location circuit, the geographic location of a mobile computing device;
   storing, in a memory, an identity of a plurality of electronic locks each securing a receptacle;
   receiving, from the mobile computing device, a mobile device identifier and a route identifier, the route identifier corresponding to a route assigned to the mobile computing device;
   identifying a set of locks of the plurality of electronic locks which are along the route identified by the route identifier;
   sending, by a server, to the set of locks, the mobile device identifier;
   communicating, via a communication circuit of the mobile computing device, the mobile device identifier, an unlock key, and an unlock command to the identified set of locks along the route based on the detected geographic position of the mobile computing device.

10. The method of claim 9, further comprising, receiving, in the mobile computing device from the server, the unlock key based on the detected geographic position of the mobile computing device.

11. The method of claim 9, further comprising, storing, on the mobile computing device a carrier identifier.

12. The method of claim 9, further comprising opening the set of locks upon receipt of the unlock key, the mobile device identifier, and the unlock command.

13. The method of claim 9, wherein the mobile computing device comprises a mobile delivery device and a fob.

14. The method of claim 13, further comprising storing a first portion of the unlock key on the fob and a second portion of the unlock key on the mobile delivery device.

15. The method of claim 14, further comprising, communicating to the set of locks the first portion of the unlock key from the fob and the second portion of the unlock key from the mobile delivery device in order to open the set of locks.

16. The method of claim 9, further comprising communicating, by the mobile computing device, the unlock key, the mobile device identifier, and the unlock command to the set of locks when the mobile computing device is within a geofence of the set of locks.

* * * * *